US009645684B2

(12) United States Patent
Chang

(10) Patent No.: US 9,645,684 B2
(45) Date of Patent: May 9, 2017

(54) SELF-CAPACITIVE TOUCH PANEL AND CONDUCTIVE LAYER STRUCTURE THEREOF

(71) Applicant: Shenzhen China Star Optoelectronics Technology Co., Ltd., Shenzhen, Guangdong (CN)

(72) Inventor: Chun-kai Chang, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 204 days.

(21) Appl. No.: 14/407,459

(22) PCT Filed: Nov. 21, 2014

(86) PCT No.: PCT/CN2014/091876
§ 371 (c)(1),
(2) Date: Dec. 11, 2014

(87) PCT Pub. No.: WO2016/078073
PCT Pub. Date: May 26, 2016

(65) Prior Publication Data
US 2016/0349869 A1    Dec. 1, 2016

(30) Foreign Application Priority Data
Nov. 18, 2014 (CN) .......................... 2014 1 0660094

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01)

(58) Field of Classification Search
CPC ................................ G06F 3/044; G06F 3/0416
See application file for complete search history.

(56) References Cited

U.S. PATENT DOCUMENTS 4,087,625 A * 5/1978 Dym ....................... G06F 3/044
178/18.06
6,288,707 B1 * 9/2001 Philipp ................. G06F 3/0213
341/22

(Continued)

FOREIGN PATENT DOCUMENTS

CN    101387934 A * 3/2009
CN    103116431 A * 5/2013

OTHER PUBLICATIONS

English translation of Li et al (CN 103116431 A).*
English translation of Lin Wei Cheng (CN 101387934 A).*

*Primary Examiner* — Julie Anne Watko
(74) *Attorney, Agent, or Firm* — Andrew C. Cheng

(57) ABSTRACT

A self-capacitive touch panel and a conductive layer structure thereof are provided. The conductive layer structure includes multiple rectangular first electrode patterns, multiple second electrode patterns and multiple peripheral wires correspondingly connected with the first electrode patterns and the second electrode patterns. The first electrode patterns are arranged in a matrix. Neighboring two rows of first electrode patterns have at least two second electrode patterns disposed therebetween, and the second electrode patterns located at a same row have widths gradually decreased or increased along row direction and thereby together form a rectangular shape as a whole. By the above described manner, the invention can accurately determine actual touch points.

20 Claims, 2 Drawing Sheets

(56) References Cited

U.S. PATENT DOCUMENTS

| | | | | |
|---|---|---|---|---|
| 9,218,087 B2* | 12/2015 | Liu | ............... | G06F 3/0418 |
| 2007/0247443 A1* | 10/2007 | Philipp | ............ | G06F 3/045 |
| | | | | 345/173 |
| 2007/0257894 A1* | 11/2007 | Philipp | ............ | G06F 3/044 |
| | | | | 345/173 |
| 2008/0252608 A1* | 10/2008 | Geaghan | ......... | G06F 3/044 |
| | | | | 345/173 |
| 2015/0227229 A1* | 8/2015 | Schwartz | ........ | G06F 3/044 |
| | | | | 345/174 |

* cited by examiner

SELF-CAPACITIVE TOUCH PANEL AND CONDUCTIVE LAYER STRUCTURE THEREOF

TECHNICAL FIELD

The invention relates to the field of touch screen technology, and particularly to a conductive layer structure and a self-capacitive touch panel using the conductive layer structure.

DESCRIPTION OF RELATED ART

The principle of a self-capacitive touch control technology is that generating a capacitive coupling between a touch control object such as a finger and a conductive layer structure and detecting a capacitance change on the conductive layer structure to determine whether a touch event has occurred. For a multi-point self-capacitive touch control, when a conductive layer structure with triangle electrode patterns is taken as an example, touched positions are obtained by calculating a ratio of regional areas of neighboring triangle electrode patterns corresponding to a touch event. However, for neighboring two triangle electrode patterns located at a same row, there are at least two positions having a same ratio of regional areas. That is, when multiple touch points occur on two triangle electrode patterns located at a same row, twice of actual touch points are generated and a half which is ghost points, resulting in the actual touch points being unable to be accurately determined/identified.

SUMMARY

Accordingly, a technical problem to be solved by the invention is to provide a self-capacitive touch panel and a conductive layer structure thereof, so as to accurately determine an actual touch point(s).

In order to solve the technical problem, a technical solution adopted by the invention is to provide a conductive layer structure. The conductive layer structure includes: multiple (i.e., more than one) rectangular first electrode patterns, multiple second electrode patterns and multiple peripheral wires correspondingly connected with the first electrode patterns and the second electrode patterns. The first electrode patterns are arranged in a matrix. Neighboring two rows of the first electrode patterns have two second electrode patterns located at a same row disposed therebetween. One of the two second electrode patterns has a width gradually decreased along row direction, the other of the two second electrode patterns has a width gradually increased along the row direction, and thereby the two second electrode patterns together form a rectangular shape as a whole. The first electrode patterns located at a same column are connected to a same one of the plurality of peripheral wires. The conductive layer structure further includes an auxiliary electrode pattern disposed at an edge position outside a coverage area of the first electrode patterns and the second electrode patterns.

In an exemplary embodiment, the two second electrode patterns are centrosymmetric two right-angled triangle electrode patterns or right-angled trapezoid electrode patterns.

In an exemplary embodiment, the auxiliary electrode pattern is a rectangle electrode pattern.

In order to solve the above technical problem, another technical solution adopted by the invention is to provide a conductive layer structure. The conductive layer structure includes multiple rectangular first electrode patterns, multiple second electrode patterns and multiple peripheral wires correspondingly connected with the first electrode patterns and the second electrode patterns. The first electrode patterns are arranged in a matrix. Neighboring two rows of the first electrode patterns have at least two of the second electrode patterns disposed therebetween. The second electrode patterns located at a same row have widths gradually decreased or increased along row direction and thereby together form a rectangular shape as a whole.

In an exemplary embodiment, the first electrode patterns located at a same column are connected to a same one of the peripheral wires.

In an exemplary embodiment, the neighboring two rows of the first electrode patterns have two second electrode patterns disposed therebetween, one of the two second electrode patterns has a width gradually decreased along the row direction, and the other of the two second electrode patterns has a width gradually increased along the row direction.

In an exemplary embodiment, the two second electrode patterns are centrosymmetric two electrode patterns of right-angled triangle or right-angled trapezoid.

In an exemplary embodiment, the neighboring two rows of the first electrode patterns have three second electrode patterns disposed therebetween, the three second electrode patterns are staggeredly arranged along column direction, one of the three second electrode patterns which is located at the middle has a width gradually decreased along the row direction, and two of the three second electrode patterns which are located at two sides have widths gradually increased along the row direction.

In an exemplary embodiment, along the row direction, changes of the widths of the three second electrode patterns located at one of neighboring two rows are reverse to changes of the widths of the three second electrode patterns located at the other of the neighboring two rows.

In an exemplary embodiment, the one of the three second electrode patterns which is located at the middle is an electrode pattern of isosceles triangle or isosceles trapezoid, the two of the three second electrode patterns which are located at the two sides are electrode patterns of right-angled triangle or right-angled trapezoid.

In an exemplary embodiment, the conductive layer structure further includes an auxiliary electrode pattern, and the auxiliary electrode pattern is disposed at an edge position outside a coverage area of the first electrode patterns and the second electrode patterns.

In an exemplary embodiment, the auxiliary electrode pattern is a rectangle electrode pattern.

In order to solve the above technical problem, still another technical solution adopted by the invention is to provide a self-capacitive touch panel. The self-capacitive touch panel includes a signal detector, a processor and a conductive layer structure. The signal detector is connected with multiple peripheral wires and configured (i.e., structured and arranged) for detecting capacitive touch control signals on row direction and on column direction. The processor is connected with the signal detector and configured for determining actual touch points in a multi-touch event according to the capacitive touch control signals. The conductive layer structure includes multiple rectangular first electrode patterns, multiple second electrode patterns and the peripheral wires correspondingly connected with the first electrode patterns and the second electrode patterns. The first electrode patterns are arranged in a matrix. Neighboring two rows of the first electrode patterns have at least two of the second electrode patterns disposed therebetween, the second electrode patterns located at a same row have widths gradually decreased or increased along the row direction and thereby together form a rectangular shape as a whole.

In an exemplary embodiment, the first electrode patterns located at a same column are connected to a same one of the peripheral wires.

In an exemplary embodiment, the neighboring two rows of the first electrode patterns have two second electrode patterns disposed therebetween, one of the two second electrode patterns has a width gradually decreased along the row direction, and the other of the two second electrode patterns has a width gradually increased along the row direction.

In an exemplary embodiment, the two second electrode patterns are centrosymmetric two electrode patterns of right-angled triangle or right-angled trapezoid.

In an exemplary embodiment, the neighboring two rows of the first electrode patterns have three second electrode patterns disposed therebetween. The three second electrode patterns are staggeredly arranged along the column direction, one of the three second electrode patterns which is located at the middle has a width gradually decreased along the row direction, and two of the three second electrode patterns which are located at two sides have widths gradually increased along the row direction.

In an exemplary embodiment, along the row direction, changes of the widths of the three second electrode patterns located at one of neighboring two rows are reverse to changes of the widths of the three second electrode patterns located at the other of the neighboring two rows.

In an exemplary embodiment, the one of the three second electrode patterns which is located at the middle is an electrode pattern of isosceles triangle or isosceles trapezoid, the two of the three second electrode patterns which are located at the two sides are electrode patterns of right-angled triangle or right-angled trapezoid.

In an exemplary embodiment, the conductive layer structure further includes an auxiliary electrode pattern, and the auxiliary electrode pattern is disposed at an edge position outside a coverage area of the first electrode patterns and the second electrode patterns.

By way of the above technical solutions, the efficacy of the invention is that: the embodiments of the invention design a conductive layer structure including multiple rectangular first electrode patterns and multiple second electrode patterns, the first electrode patterns being arranged in a matrix, neighboring two rows of first electrode patterns having at least two second electrode patterns disposed therebetween, the second electrode patterns located at a same row having widths gradually decreased or increased along row direction and thereby together forming a rectangular shape as a whole, by detecting capacitances corresponding to the first electrode patterns and the second electrode patterns whether are changed, actual touch points and ghost points can be accurately identified and the positions of the actual touch points can be obtained consequently.

BRIEF DESCRIPTION OF THE DRAWINGS

In order to more clearly illustrate the technical solutions of various embodiments of the present invention, drawings will be used in the description of embodiments will be given a brief description below. Apparently, the drawings in the following description only are some embodiments of the invention, the ordinary skill in the art can obtain other drawings according to these illustrated drawings without creative effort. In the drawings.

DETAILED DESCRIPTION OF EMBODIMENTS

In the following, with reference to accompanying drawings of embodiments of the invention, technical solutions in the embodiments of the invention will be clearly and completely described. Apparently, the embodiments of the invention described below only are a part of embodiments of the invention, but not all embodiments. Based on the described embodiments of the invention, all other embodiments obtained by ordinary skill in the art without creative effort belong to the scope of protection of the invention.

Figure 1:
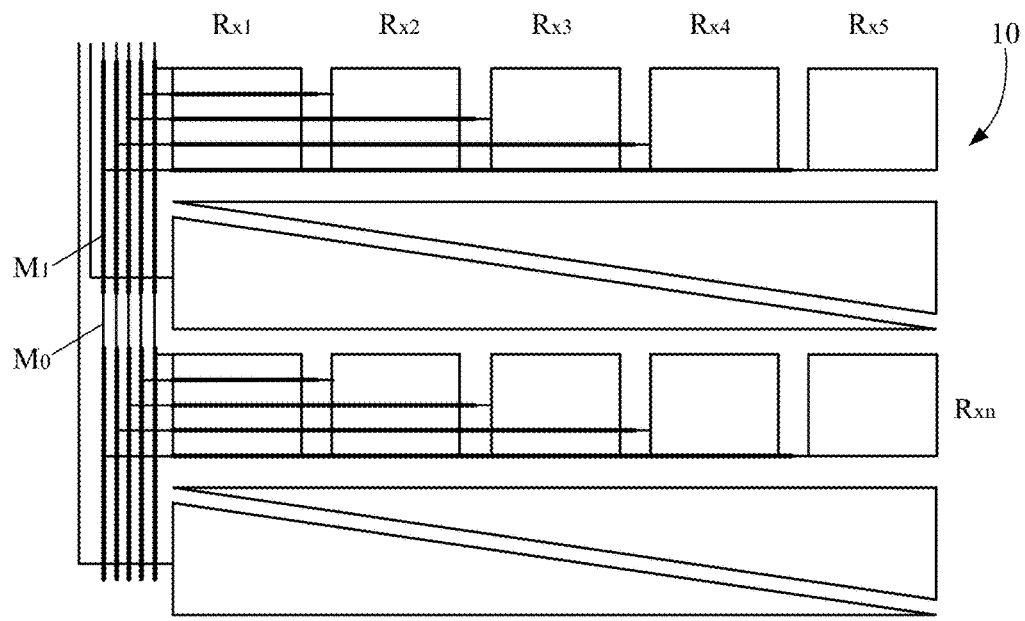
FIG. 1 is a first schematic structural view of a conductive layer structure according to a first embodiment of the invention.
Figure 2:
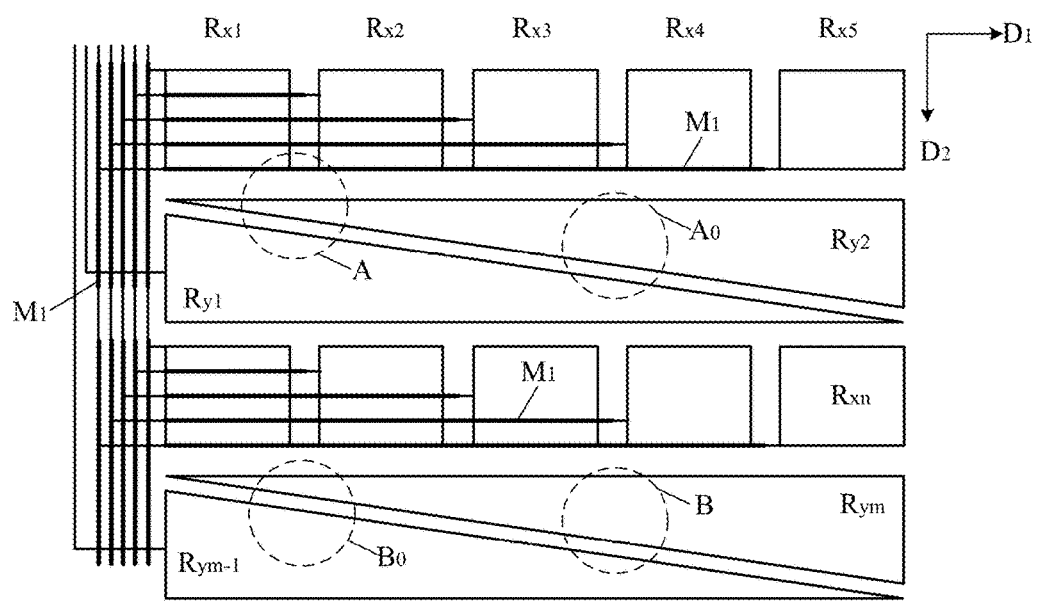
FIG. 2 is a second schematic structural view of the conductive layer structure according to the first embodiment of the invention.

Referring to FIGS. 1 and 2, the conductive layer structure 10 provided by an embodiment of the invention is disposed on a surface of a substrate made of glass or film material. The conductive layer structure 10 includes multiple (i.e., more than one) rectangular first electrode patterns $R_{x1}$, $R_{x2}$, $R_{x3}$, $R_{x4}$, $R_{x5}$, . . . , $R_{xn}$, multiple second electrode patterns $R_{y1}$, $R_{y2}$, . . . , $R_{ym-1}$, $R_{ym}$, and multiple peripheral wires $M_0$ correspondingly connected with the first electrode patterns $R_{x1}$, $R_{x2}$, $R_{x3}$, $R_{x4}$, $R_{x5}$, . . . , $R_{xn}$, and the second electrode patterns $R_{y1}$, $R_{y2}$, . . . , $R_{ym-1}$, $R_{ym}$.

The first electrode patterns $R_{x1}$, $R_{x2}$, $R_{x3}$, $R_{x4}$, $R_{x5}$, . . . , $R_{xn}$, are arranged in a matrix, and neighboring two rows of first electrode patterns have two second electrode patterns disposed therebetween. Two second electrode patterns located at a same row have widths gradually decreased and increased respectively along row direction, so that the two second electrode patterns as a whole have a rectangular shape. For example, the second electrode patterns $R_{x1}$, $R_{x2}$ are located at a same row, along the first direction $D_1$, the second electrode pattern $R_{x1}$ has a width gradually decreased and the second electrode pattern $R_{x2}$ has a width gradually increased; the second electrode patterns $R_{x1}$, $R_{x2}$ are centrosymmetric two right-angled triangles and thus matched with each other to together form a rectangular shape as a whole. The first direction $D_1$ is parallel to the row direction of the matrix arrangement.

The first electrode patterns located at a same row, i.e., the multiple first electrode patterns arranged along a second direction $D_2$ parallel to the column direction of the matrix arrangement, are connected to a same one of the peripheral wires $M_0$. The first direction $D_1$ is perpendicular to the second direction $D_2$. In this embodiment, preferably, the conductive layer structure 10 further includes multiple transversally and longitudinally disposed connection wires $M_1$. By using the connection wires $M_1$ to serially-connect the peripheral wires $M_0$ connected with different rows of first electrode patterns, the first electrode patterns located at a same column but different rows are connected to a same peripheral wire $M_0$.

In this embodiment, preferably, the first electrode patterns $R_{x1}, R_{x2}, R_{x3}, R_{x4}, R_{x5}, \ldots, R_{xn}$, and the second electrode patterns $R_{y1}, R_{y2}, \ldots, R_{ym-1}, R_{ym}$ are made of a transparent electrically conductive material such as ITO (indium tin oxide). The first electrode patterns $R_{x1}, R_{x2}, R_{x3}, R_{x4}, R_{x5}, \ldots, R_{xn}$, and the second electrode patterns $R_{y1}, R_{y2}, \ldots, R_{ym-1}, R_{ym}$ together constitute multiple sense units of the conductive layer structure 10 (touch screen).

Figure 3:
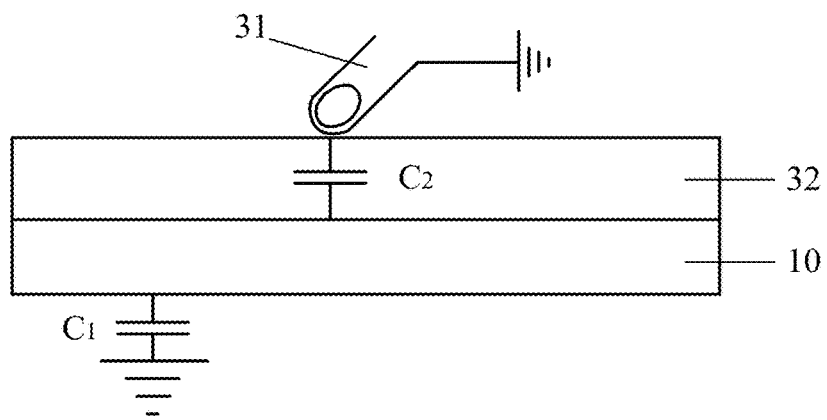
FIG. 3 is a first working principle diagram of a conductive layer structure according to an embodiment of the invention.
Figure 4:
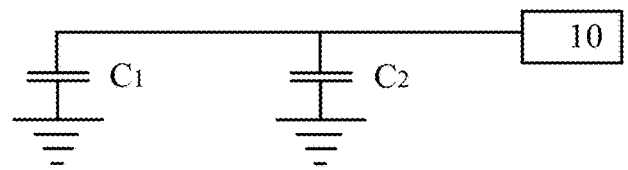
FIG. 4 is a second working principle diagram of a conductive layer structure according to an embodiment of the invention.

Further referring to FIG. 3, the first electrode pattern and the second electrode pattern respectively form self capacitors $C_1$ with respect to the ground. When a finger 31 touches a cover plate 32 of the touch screen, since the human body may be equivalent to the ground, the finger 31 and the first electrode pattern or the second electrode pattern form a capacitor $C_2$ therebetween. The capacitor C2 and the capacitor C1 form a parallel circuit as shown in FIG. 4, which makes a capacitance of a corresponding sense unit to be increased. Based on this, by detecting the capacitance change of each sense unit, a touch event whether occurs can be judged, and further a position(s) of a touch point(s) can be determined by coordinate information of the first electrode patterns and the second electrode patterns on the touch screen.

Still referring to FIG. 2, when the touch event includes two touch points A, B, by calculating a ratio of regional areas on the second electrode patterns $R_{y1}, R_{y2}$ corresponding to the touch point A and a ratio of regional areas on the second electrode patterns $R_{ym-1}, R_{ym}$ corresponding to the touch point B, two touch positions of the touch point A on the first direction D1 with a same ratio of regional areas, i.e., actual touch point A and ghost point $A_0$, can be obtained; likewise, two touch positions of the touch point B on the first direction D1 corresponding to a same ratio of regional areas, i.e., actual touch point B and ghost point $B_0$, can be obtained.

By detecting capacitances corresponding to the first electrode patterns $R_{x1}, R_{x2}$ whether are changed and capacitances corresponding to the first electrode patterns $R_{x3}, R_{x4}$ whether are changed, the actual touch points A, B and the ghost points $A_0, B_0$ can be accurately determined/identified. For example, for the actual touch point A and the ghost point $A_0$ located at the same row, the capacitances corresponding to the first electrode patterns $R_{x1}, R_{x2}$ are changed while the capacitances corresponding to the first electrode patterns $R_{x3}, R_{x4}$ are not changed. For the actual touch point B and the ghost point $B_0$ located at the same row, the capacitances corresponding to the first electrode patterns $R_{x1}, R_{x2}$ are not changed while the capacitances corresponding to the first electrode patterns $R_{x3}, R_{x4}$ are changed.

Furthermore, by judging positions of capacitance change corresponding to the first electrode patterns $R_{x1}, R_{x2}$, a coordinate on the first direction $D_1$ (X-axis) of the actual touch point A can be obtained, and by judging positions of capacitance change corresponding to the second electrode patterns $R_{y1}, R_{y2}$, a coordinate on the second direction $D_2$ (Y-axis) of the actual touch point A can be obtained. Likewise, by judging positions of capacitance change corresponding to the first electrode patterns $R_{x3}, R_{x4}$, a coordinate on the first direction $D_1$ (X-axis) of the actual touch point B can be obtained, and by judging positions of capacitance change corresponding to the second electrode patterns $R_{ym-1}, R_{ym}$, a coordinate on the second direction $D_2$ (Y-axis) of the actual touch point B can be obtained. As a result, the positions of the actual touch points A, B on the touch screen can be obtained.

A second embodiment of the invention provides another conductive layer structure, and a difference from the conductive layer structure 10 of the first embodiment is that: neighboring two rows of first electrode patterns of the conductive layer structure 20 according to the second embodiment are disposed with three second electrode patterns therebetween.

Figure 5:
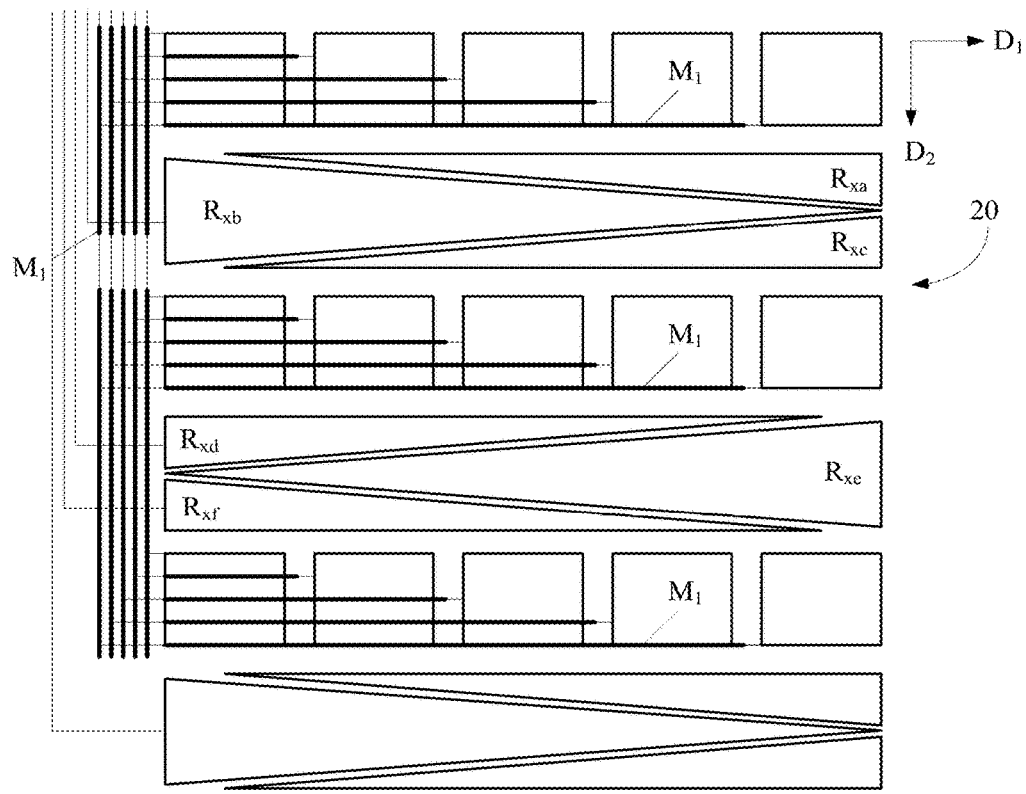
FIG. 5 is a schematic structural view of a conductive layer structure according to a second embodiment of the invention.

As illustrated in FIG. 5, second electrode patterns $R_{xa}, R_{xb}, R_{xc}$ are located in a same row. The second electrode patterns $R_{xa}, R_{xb}, R_{xc}$ are staggeredly arranged along the second direction $D_2$, the middle three second electrode pattern $R_{xb}$ has a width gradually decreased along the first direction $D_1$, and the second electrode patterns $R_{xa}, R_{xc}$ located at two sides have widths gradually increased along the first direction $D_1$. The second electrode pattern $R_{xa}$ and the second electrode pattern $R_{xc}$ may be symmetrical with respect to an axis along the first direction $D_1$ or asymmetrical with each other.

Furthermore, preferably, the width changes of the three second electrode patterns locater at one of neighboring two rows are reverse to the width changes of the three second electrode patterns located at the other one of the neighboring two rows. For example, the second electrode patterns $R_{xa}, R_{xb}, R_{xc}$ are located at a same row, and the second electrode patterns $R_{xd}, R_{xe}, R_{xf}$ are located neighboring another same row, along the first direction $D_1$, the width of the second electrode pattern $R_{xb}$ gradually decreases while the width of the second electrode pattern $R_{xe}$ gradually increases, the width of the second electrode pattern $R_{xa}$ gradually increases while the width of the second electrode pattern $R_{xd}$ gradually decreases, the width of the second electrode pattern $R_{xc}$ gradually increases while the width of the second electrode pattern $R_{xf}$ gradually decreases.

A primary objective of the embodiments of the invention is to design a conductive layer structure including multiple rectangular first electrode patterns, multiple second electrode patterns and multiple peripheral wires correspondingly connected with the first electrode patterns and the second electrode patterns, the multiple first electrode patterns being arranged in a matrix, neighboring two rows of first electrode patterns having at least two second electrode pattern disposed therebetween, and the second electrode patterns located at a same row having widths gradually decreased or increased along row direction and thereby together forming a rectangular shape as a whole.

Based on this, the conductive layer structure of the invention may have other configuration, for example, the two second electrode patterns $R_{y1}, R_{y2}$ located at a same row are not limited to the right-angled triangle electrode patterns as shown in FIG. 1, and may be right-angled trapezoid electrode patterns instead. The second electrode pattern $R_{xb}$ located at the middle as shown in FIG. 5 is not limited to the isosceles triangle electrode pattern, and may be an isosceles trapezoid electrode pattern instead. The two second electrode patterns $R_{xa}, R_{xc}$ located at two sides as shown in FIG. 5 are not limited to the right-angle triangle electrode patterns, and may be right-angled trapezoid electrode patterns instead.

In addition, it may be that reducing a height of the first electrode patterns in FIG. 5 arranged along the first direction $D_1$ but keeping the dimension of the second electrode patterns unchanged, so that the finger(s) can touch the electrode pattern as much as possible in a touch event to thereby improve the accuracy of touch point determination/identification.

Moreover, the conductive layer structure may further include auxiliary electrode patterns preferably being rectangular. The auxiliary electrode patterns are disposed at edge positions outside the coverage area of the first electrode patterns and the second electrode patterns, i.e., edge positions of the area covered by the electrode patterns shown in FIG. 1 or FIG. 2 are added with auxiliary electrode patterns. When the finger touches an edge position of the coverage area, using an area of touched area on the touched auxiliary electrode pattern to compensate the loss of area of the electrode pattern coverage area, which is equivalent to reduce the loss of area of the electrode pattern coverage area, the coordinate offset at the edge position of the touch screen can be reduced, the drift phenomenon at the edge of touch screen can be effectively improved.

The invention further provides a self-capacitive touch panel. The self-capacitive touch panel includes a signal detector, a processor and the conductive layer structure described in any one of the above embodiments (e.g., the conductive layer structure 10 or 20). The signal detector is correspondingly connected with the multiple peripheral wires $M_0$ to detect capacitive touch control signals on row direction as well as on column direction. The processor is connected with the signal detector to determine actual touch points in a multi-touch event according to the detected capacitive touch control signals and thereby obtain the positions of the actual touch points.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A conductive layer structure comprising: a plurality of rectangular first electrode patterns, a plurality of second electrode patterns and a plurality of peripheral wires correspondingly electrically connected with the plurality of first electrode patterns and the plurality of second electrode patterns;
   wherein the plurality of first electrode patterns are arranged in a two-dimensional matrix, and multiple first electrode patterns located at a same row of the matrix form one first electrode pattern group such that the plurality of first electrode patterns located at different rows of the matrix form multiple first electrode pattern groups; each neighboring two of the first electrode pattern groups have two second electrode patterns disposed therebtween, the two second electrode patterns form one second electrode pattern group such that the plurality of second electrode patterns form multiple second electrode pattern groups alternately arranged with the first electrode pattern groups along column direction of the matrix; one of the two second electrode patterns has a width gradually decreased along row direction of the matrix, the other of the two second electrode patterns has a width gradually increased along the row direction of the matrix, and thereby the two second electrode patterns together form a rectangular shape as a whole;
   wherein the first electrode patterns located at a same column of the matrix are electrically connected to a same one of the plurality of peripheral wires, the conductive layer structure further comprises an auxiliary electrode pattern disposed at an edge position outside a coverage area of the plurality of first electrode patterns and the plurality of second electrode patterns.

2. The conductive layer structure as claimed in claim 1, wherein the two second electrode patterns are two centrosymmetric electrode patterns of right-angled triangle or right-angled trapezoid.

3. The conductive layer structure as claimed in claim 1, wherein the auxiliary electrode pattern is a rectangle electrode pattern.

4. A conductive layer structure comprising: a plurality of rectangular first electrode patterns, a plurality of second electrode patterns and a plurality of peripheral wires correspondingly electrically connected with the plurality of first electrode patterns and the plurality of second electrode patterns;
   wherein the plurality of first electrode patterns are arranged in a two-dimensional matrix, and multiple first electrode patterns located at a same row of the matrix form one first electrode pattern group such that the plurality of first electrode patterns located at different rows of the matrix form multiple first electrode pattern groups; each neighboring two of the first electrode pattern groups have at least two second electrode patterns disposed therebtween, the at least two second electrode patterns form one second electrode pattern group such that the plurality of second electrode patterns form multiple second electrode pattern groups alternately arranged with the first electrode pattern groups along column direction of the matrix; the at least two second electrode patterns of each second electrode pattern group have widths gradually decreased or increased along row direction of the matrix and thereby together form a rectangular shape as a whole.

5. The conductive layer structure as claimed in claim 4, wherein the first electrode patterns located at a same column of the matrix are electrically connected to a same one of the plurality of peripheral wires.

6. The conductive layer structure as claimed in claim 4, wherein each neighboring two of the first electrode pattern groups have two second electrode patterns disposed therebetween as one second electrode pattern group, one of the two second electrode patterns has a width gradually decreased along the row direction of the matrix, and the other of the two second electrode patterns has a width gradually increased along the row direction of the matrix.

7. The conductive layer structure as claimed in claim 6, wherein the two second electrode patterns are two centrosymmetric electrode patterns of right-angled triangle or right-angled trapezoid.

8. The conductive layer structure as claimed in claim 4, wherein each neighboring two of the first electrode pattern groups have three second electrode patterns disposed therebetween as one second electrode pattern group, the three second electrode patterns are staggeredly arranged along column direction of the matrix, one of the three second electrode patterns which is located at the middle has a width gradually decreased along the row direction of the matrix, and two of the three second electrode patterns which are located at two sides have widths gradually increased along the row direction of the matrix.

9. The conductive layer structure as claimed in claim 8, wherein along the row direction of the matrix, changes of the widths of the three second electrode patterns as one second electrode pattern group are reverse to changes of the widths of the three second electrode patterns as neighboring one second electrode pattern group.

10. The conductive layer structure as claimed in claim 8, wherein the one of the three second electrode patterns which is located at the middle is an electrode pattern of isosceles triangle or isosceles trapezoid, the two of the three second electrode patterns which are located at the two sides are electrode patterns of right-angled triangle or right-angled trapezoid.

11. The conductive layer structure as claimed in claim 4, wherein the conductive layer structure further comprises an auxiliary electrode pattern, and the auxiliary electrode pattern is disposed at an edge position outside a coverage area of the plurality of first electrode patterns and the plurality of second electrode patterns.

12. The conductive layer structure as claimed in claim 11, wherein the auxiliary electrode pattern is a rectangle electrode pattern.

13. A self-capacitive touch panel comprising a signal detector, a processor and a conductive layer structure; the signal detector being connected with a plurality of peripheral wires and for detecting capacitive touch control signals on row direction and on column direction, the processor being connected with the signal detector and for determining actual touch points in a multi-touch event according to the capacitive touch control signals; the conductive layer structure comprising a plurality of rectangular first electrode patterns, a plurality of second electrode patterns and the plurality of peripheral wires correspondingly electrically connected with the plurality of first electrode patterns and the plurality of second electrode patterns;

wherein the plurality of first electrode patterns are arranged in a two-dimensional matrix, and multiple first electrode patterns located at a same row of the matrix form one first electrode pattern group such that the plurality of first electrode patterns located at different rows of the matrix form multiple first electrode pattern groups; each neighboring two of the first electrode pattern groups have at least two second electrode patterns disposed therebtween, the at least two second electrode patterns form one second electrode pattern group such that the plurality of second electrode patterns form multiple second electrode pattern groups alternately arranged with the first electrode pattern groups along column direction of the matrix; the at least two second electrode patterns of each second electrode pattern group have widths gradually decreased or increased along the row direction of the matrix and thereby together form a rectangular shape as a whole.

14. The self-capacitive touch panel as claimed in claim 13, wherein the first electrode patterns located at a same column of the matrix are electrically connected to a same one of the plurality of the peripheral wires.

15. The self-capacitive touch panel as claimed in claim 13, wherein each neighboring two of the first electrode pattern groups have two second electrode patterns disposed therebetween as one second electrode pattern group, one of the two second electrode patterns has a width gradually decreased along the row direction of the matrix, and the other of the two second electrode patterns has a width gradually increased along the row direction of the matrix.

16. The self-capacitive touch panel as claimed in claim 15, wherein the two second electrode patterns are centro-symmetric two electrode patterns of right-angled triangle or right-angled trapezoid.

17. The self-capacitive touch panel as claimed in claim 13, wherein each neighboring two of the first electrode pattern groups have three second electrode patterns disposed therebetween as one second electrode pattern group, the three second electrode patterns are staggeredly arranged along the column direction of the matrix, one of the three second electrode patterns which is located at the middle has a width gradually decreased along the row direction of the matrix, and two of the three second electrode patterns which are located at two sides have widths gradually increased along the row direction of the matrix.

18. The self-capacitive touch panel as claimed in claim 17, wherein along the row direction of the matrix, changes of the widths of the three second electrode patterns as one second electrode pattern group are reverse to changes of the widths of the three second electrode patterns as neighboring one second electrode pattern group.

19. The self-capacitive touch panel as claimed in claim 17, wherein the one of the three second electrode patterns which is located at the middle is an electrode pattern of isosceles triangle or isosceles trapezoid, the two of the three second electrode patterns which are located at the two sides are electrode patterns of right-angled triangle or right-angled trapezoid.

20. The self-capacitive touch panel as claimed in claim 13, wherein the conductive layer structure further comprises an auxiliary electrode pattern, and the auxiliary electrode pattern is disposed at an edge position outside a coverage area of the plurality of first electrode patterns and the plurality of second electrode patterns.

* * * * *